No. 709,849. Patented Sept. 23, 1902.
A. DE MAN.
VAULT LIGHT.
(Application filed Oct. 19, 1901.)
(No Model.) 2 Sheets—Sheet 1.
Fig. 1
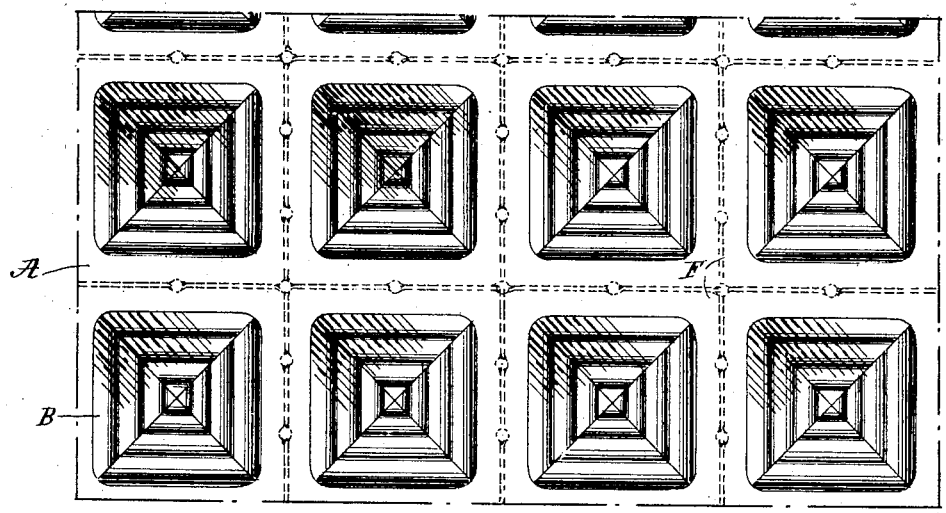
Fig. 2
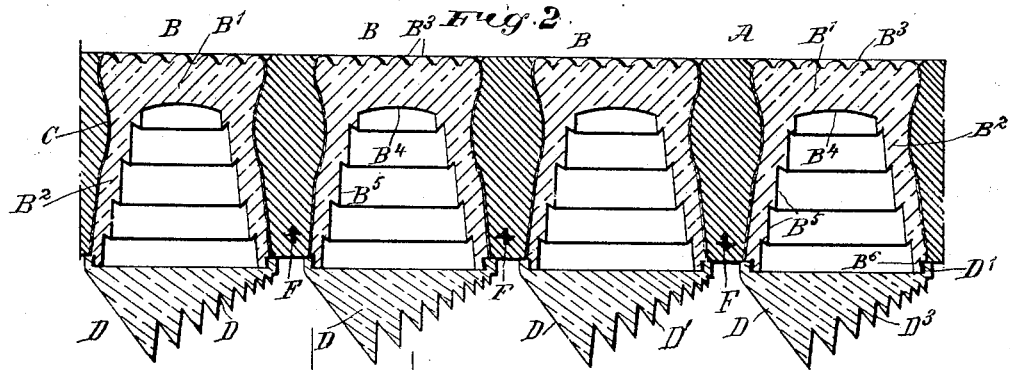
Fig. 3
WITNESSES: INVENTOR
Alphonse De Man
BY
ATTORNEYS

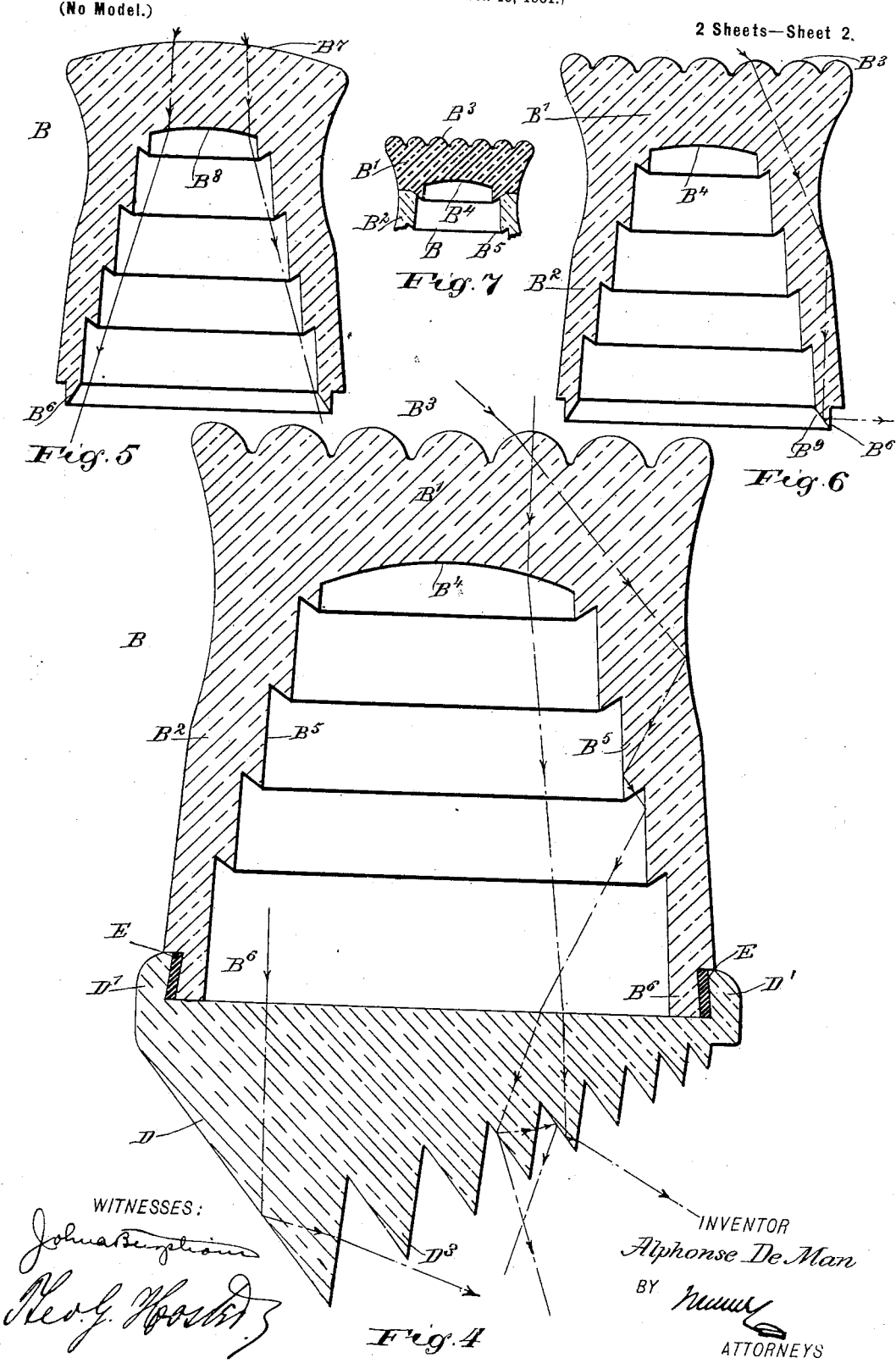

UNITED STATES PATENT OFFICE.

ALPHONSE DE MAN, OF NEW YORK, N. Y.

VAULT-LIGHT.

SPECIFICATION forming part of Letters Patent No. 709,849, dated September 23, 1902.

Application filed October 19, 1901. Serial No. 79,259. (No model.)

*To all whom it may concern:*

Be it known that I, ALPHONSE DE MAN, a citizen of the United States, and a resident of the city of New York, borough of Manhattan, in the county and State of New York, have invented a new and Improved Vault-Light, of which the following is a full, clear, and exact description.

The object of the invention is to provide a new and improved vault-light, more especially designed for illuminating subways, basements, vaults, and the like and arranged to avoid the frequent breaking or chipping of the glass lenses as heretofore employed and to insure full utilization and distribution of the rays of light to properly illuminate a vault, subway, or basement.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is a sectional side elevation of the same. Fig. 3 is an enlarged sectional elevation of one of the pendants for a lens. Fig. 4 is an enlarged sectional side elevation of a complete lens and pendant, and Figs. 5, 6, and 7 are similar views of modified forms of lenses.

The improved vault-light consists, essentially, of a concrete slab A, in which are embedded lenses B, and between the latter and the slab material are interposed thin layers C of a suitable waterproof and elastic material, as plainly shown in Fig. 2. The lenses B consist, essentially, of a top $B'$ and a hollow extension $B^2$, extending the thickness of the slab A, (see Fig. 2,) and the outer wall of the said top $B'$ at the extension $B^2$ is somewhat contracted to insure secure holding of the lens in the slab material, it being understood that the lenses and surrounding layers C are placed in position in the slab material at the time the latter is in a plastic state, so that when the slab material hardens the lenses are securely embedded and held in place, especially as the elastic layers C compensate for any difference of expansion and contraction of the slab material and the lenses. The contracted outer faces of the extension $B^2$, as well as the top $B'$, form mirror-faces with the coating C, as the mirror-back and said mirror-face are curved to reflect all the rays that pass into the extension-body in a downward direction.

The upper surface $B^3$ of each lens is composed of ribs or faces semicylindrical in cross-section, while the under side $B^4$ of the said top is curved or arched to form a concave lens for diverging the light-beams, as shown in Figs. 4 and 5, it being understood that the said faces $B^3$ not only admit more rays of light in the glass body of the lens, but at the same time form a roughened surface to prevent persons from slipping when walking over the vault-light. By having the top of each lens formed of semicylindrical ribs a light-absorbing surface is attained greatly in excess of the horizontal area of the lens, each rib being continuous, following the outer shape of the top. Furthermore, the rib-faces $B^3$ prevent chipping or breaking of the top when boxes or the like are moved over the vault-light and also permit a more rapid change of temperature in the lens, as the depressions between the ribs penetrate the mass of glass and prevent its cracking.

The extension $B^2$ of each lens B is formed on the inside with prism-ribs $B^5$, constructed in such manner that the beams of light entering the top $B'$ are properly reflected to pass in a downward direction, as indicated in Fig. 5, it being understood that beams of light which enter a glass body cannot emerge upon the opposite surface unless they strike the emerging surface at an angle less than forty-two degrees from the vertical, and which angle is called the "critical" angle. It is understood that the outer contracted surface of the extension $B^2$ and top $B'$ forms a very good reflecting-surface for the rays of light to pass through the glass wall downward, and as the inside surface of the extension $B^2$ is formed of prism-ribs, as described, it is evident that the reflected rays of light will strike the inside emerging surface at angles less than the critical angle, thus letting the rays of light pass through instead of causing the same to be totally reflected inside of its mass and lost as illuminating-rays. By reference to the drawings it will be seen that the opening in the extension B² increases in size from top to bottom, and the curvature of the under surface B⁴ depends on the size of the said opening to cause the rays of light emerging from the said surface B⁴ to pass in diverging beams through the extension-opening.

It is frequently necessary to deflect the light furnished by the lenses in a sidewise direction, so as to afford better illumination at a certain distance from the vault-light in the basement of a building, and for this purpose I employ prismatic pendants D, formed at their upper ends with flanges D', as shown in Fig. 3, fastened to correspondingly-shaped flanges B⁶ on the lower ends of the extensions B², as illustrated in Fig. 2. In case the vault-light is of circular form the flanges D' can be provided with an internal thread D² for screwing on a correspondingly-threaded flange B⁶; but this thread D² may be omitted and a cement or transparent binding material E may be employed for fastening the flanges D' and B⁶ together, as illustrated in Fig. 4, which binding material is preferably used when the vault-lights are rectangular. The underside of each pendant D is provided with prism-ribs D³, preferably arranged in step form and graduated so that the deflected rays of light from one rib do not interfere with the rays of light deflected from the adjacent rib. (See Figs. 3 and 4.) It is understood that the ribs D³ are set at right angles to the direction in which the light is to be thrown.

In order to strengthen the slab A, I prefer to reinforce the same by reinforce members F, preferably made of flat bars twisted at intervals and such as described in my Letters Patent for a "Fireproof construction," No. 606,988, dated July 5, 1898, and passed through the slab material between adjacent lenses, the members extending both in transverse and longitudinal directions, as indicated in Figs. 1 and 2.

In the modified form shown in Fig. 5 the top surface B⁷ of the lens B is arched, but at such a radius that the combined refractions due to the upper and lower surfaces bring the emerging beam parallel to the general direction of the inner surface of the extension of the lens, as shown in Fig. 5, the remaining portion of this lens being the same as above described in reference to Fig. 4. The vault-lights shown in plan, Fig. 1, are rectangular; but as a modified form they can be made in any other shape.

The construction shown in Fig. 6 differs from the one shown in Fig. 4 by having the flange B⁶ beveled at the inside, as at B⁹, to send the rays of light from this bevel outwardly in a horizontal direction. The flange B⁶ in the lens shown in Fig. 5 may also be beveled at the inside.

In some cases it may be desirable to have the top B' separate from the extension (see Fig. 7) to prevent breaking by unequal expansion and contraction between these two parts. In this case a transparent cement or like material is used between the contacting surfaces to prevent foreign matter from passing into the joint. In case of breaking of the top it may be readily removed without destroying the extension. It is understood that by making the extension B² of the lenses hollow less material is required, and hence the extension is less bulky and the extension-wall can more readily expand and contract without danger of cracking.

Having thus described my invention, I claim as new and desire to secure by Letters Patent—

1. A vault-light, comprising a self-sustaining concrete slab and diverging lenses embedded therein, and each having a hollow extension at its under side, the opening of the extension increasing in size toward the bottom, the top of the lens being so constructed relative to the extension-opening that the downward rays emerging from the inner face of the top will pass in diverging beams through the extension-opening, the extension having prismatic ribs running crosswise of the axis of the lens at the inner surface of the extension-walls, as set forth.

2. A vault-light having a diverging lens provided with an integral hollow extension at its under side, the opening of the extension increasing in size toward the bottom, the top of the lens being so arranged relative to the extension-opening that the downward rays emerging from the inner face of the top will pass in diverging beams through the extension-opening, the said inner face of the extension being provided with prismatic ribs extending crosswise of the axis of the lens and arranged to intercept and refract through the prisms downward rays of light entering into the mass of the wall of the extension, the outer side of said extension being contracted between the top and the bottom as set forth.

3. A vault-light having a diverging lens, and a hollow extension at the under side of the lens, the opening of the extension increasing toward the bottom, the inner face of the top of the diverging lens being concave, the curvature of said surface corresponding to the size of the extension-opening, so that the downward rays emerging from the said inner face of the top of the lens will pass through the extension-opening in a direction approximately parallel with the inner face of the wall thereof, the inner wall of the extension having a series of prismatic ribs extending crosswise of the axis of the lens and arranged in step form to intercept and refract through the prisms the downward rays entering into the mass of the wall of the extension, the outer side of the wall of said extension having a curved contracted portion between the top and bottom, as set forth.

4. A vault-light having a diverging lens with a hollow extension therefor, the opening of the extension increasing toward the bottom of the extension so as to bring the inner face of the wall of the extension parallel with the rays emerging from the inner surface of the lens above, the said inner face of the wall of the extension having prismatic ribs running crosswise of the axis of the lens and arranged in step form to intercept and refract through the prisms, the downward rays entering into the mass of the wall of the extension, as set forth.

5. A vault-light, comprising a concrete slab, reinforce members embedded therein, and lenses embedded in the said slab and extending from the top to the bottom thereof, the lenses each having a hollow extension the opening of which increases in size toward the bottom, the inner side of the wall of the extension having prismatic ribs crosswise of the axis of the lens and arranged in step form and deflecting the rays of light sidewise through the prisms, the reinforce members extending in the slab material between adjacent lenses, as set forth.

6. A vault-light having lenses with hollow extensions and pendants secured thereto, the lenses and the extensions serving to send the rays of light in a downward direction, and the said pendants closing up the lower part of the hollow extension, the under part of each pendant being provided with graduated prism-ribs, the lower projecting edges of the prism-ribs extending in a slanting line whereby the horizontal refracted rays will not be intercepted by adjoining prism-ribs, as set forth.

7. A lens for vault-lights, comprising a top having its under side concave and a hollow extension for the top, the opening in the said extension increasing in size from the top to the bottom, the curvature of the under face of the top corresponding to the size of the opening to cause the downward rays emerging from the inner face of the top to pass through the extension-opening parallel with the inner surface thereof, the said inner surface of the extension having prismatic cross-ribs arranged one above the other in different vertical planes, to intercept and refract through the prisms the downward rays entering into the mass of the wall of the extension, a pendant closing the bottom opening of the hollow extension and having graduated prismatic ribs, and a transparent material in the joint of said extension and bottom pendant, as set forth.

8. A vault-light, comprising a concrete slab and lenses embedded therein, each lens having a contracted outer surface and comprising a top having its under surface concave to diverge the rays of light, and a hollow extension for the top having its opening increasing in size toward the bottom, the curvature of the under surface of the top corresponding to the size of the extension-opening to cause the downward rays emerging from the inner concave surface of the top to pass through the extension - opening approximately parallel with the inner surface of the wall thereof, the inner face of the extension having prismatic ribs, and a waterproof and elastic material interposed between the slab material and the lens and forming with the latter a mirror-surface to reflect the rays passing into the extension-body, as set forth.

9. A vault-light, comprising a top and a hollow integral extension on the under side of the said top, the said top having its upper and under surfaces arched, and the inside of the said extension being provided with prism-ribs extending crosswise of the axis of the lens, and a pendant having a flange for attachment to a flange on the said extension, the said pendant also having graduated prism-ribs at its under side and arranged in step form, as set forth.

10. A lens for a vault-light, comprising a top, a depending hollow extension therefor, the opening in the extension increasing in size from the top to the bottom, the inner wall of said extension being provided at its opposite sides with undercuts forming prism-ribs, the ribs of each side being arranged one above the other but in different vertical planes, and a pendant closing the said hollow extension at the lower end, the pendant having a series of prism-ribs at its under side, the ribs of the pendant being graduated in size and arranged in step form, as set forth.

11. A vault-light comprising a concrete slab, lenses embedded therein, each lens being rectangular in shape and comprising a top and a depending hollow extension for the top, the lenses each having a contracted outer surface, a coating for the said outer surface to form a reflecting mirror-surface therefor, the opening of the said hollow extension increasing in size from the top to the bottom and the inner surface of said extension being provided at opposite sides with undercuts forming prism-ribs, the ribs of each side being in different vertical planes, and a pendant closing the hollow extension at the lower end and having a series of prism-ribs at its under side, the ribs being graduated in size and arranged in step form, as set forth.

12. A vault-light provided with a lens comprising a top, concave on its under side for diverging the rays passing through the top, and a depending hollow extension for said top, the opening in the extension increasing in size from the top to the bottom, the inner face of the wall of said extension being so arranged relative to the concave top that the diverging rays extend parallel therewith, the lens having a contracted outer surface and a coating for said outer surface to form a reflecting mirror-surface therefor, the said inner wall of the extension being provided at opposite sides with a series of undercuts forming prism-ribs arranged one above the other in different vertical planes, the said prism-ribs being arranged to intercept and refract the downward rays entering the mass of the wall of the extension as set forth.

13. In vault-lights having prismatic-ribbed surfaces for deflecting the rays of light, a series of graduated prismatic ribs running parallel side by side and having their projecting edges on a slanting line to allow the emerging rays to pass clear of the projecting edges of adjoining prismatic ribs, the opposite sides of each prismatic rib being inclined at different angles to a vertical plane passing through the projecting edge or apex of the rib, whereby one side of each prism deflects the downward rays and the other side allows the deflected rays to pass through and emerge in a lateral direction, as set forth.

14. A lens for vault-lights rectangular in shape and comprising a top and a depending hollow extension, the inner surface of said extension being provided at opposite sides with parallel prismatic ribs extending crosswise of the axis of the lens, the ribs of each side being arranged one above the other but in different vertical planes, as set forth.

15. A lens for vault-lights comprising a top concave on the under surface for diverging the downward rays passing through the top, and a depending hollow extension for said top, the opening in the extension increasing in size from the top to the bottom, and so arranged relative to the curvature of the concave top that the rays emerging from the inner surface of the top will pass through the extension-opening approximately parallel with the inner face thereof, the said inner face of the extension being provided at opposite sides with parallel prism-ribs, the ribs of each side running crosswise of the axis of the lens, and arranged one above the other in different vertical planes, as set forth.

In testimony whereof I have signed my name to this specification in the presence of two subscribing witnesses.

ALPHONSE DE MAN.

Witnesses:
 THEO. G. HOSTER,
 EVERARD B. MARSHALL.